United States Patent [19]

Seto et al.

[11] Patent Number: 5,232,716
[45] Date of Patent: Aug. 3, 1993

[54] MOLD EXCHANGING DEVICE FOR BLOW MOLDING APPARATUS

[75] Inventors: Yasuhiro Seto; Hitoshi Nakashima; Toshiyuki Shiraishi, all of Hiroshima, Japan

[73] Assignee: Kurata Corporation, Hiroshima, Japan

[21] Appl. No.: 814,578

[22] Filed: Dec. 30, 1991

[51] Int. Cl.⁵ .............................. B29C 49/42
[52] U.S. Cl. .................... 425/185; 425/186; 425/522; 425/535
[58] Field of Search .......... 425/185, 186, 190, 192 R, 425/522, 532, 539, 535

[56] References Cited

U.S. PATENT DOCUMENTS

| | | | |
|---|---|---|---|
| 3,685,938 | 8/1972 | Lagoutte | 425/539 X |
| 3,907,475 | 9/1975 | Bowers | 425/535 X |
| 4,484,884 | 11/1984 | Wiatt et al. | 425/535 X |
| 4,923,381 | 5/1990 | Delmer et al. | 425/186 X |
| 5,063,648 | 11/1991 | Yonezawa et al. | 425/185 X |

FOREIGN PATENT DOCUMENTS 3801032 7/1989 Fed. Rep. of Germany.

OTHER PUBLICATIONS

Plastverarbeiter, No. 12, Dec. 1990, Speyer/Rhein DE, pp. 18-22; "Werkzeugwechsel In 15 Minuten Moglich Gemacht".
Kunststoffberater, No. 6, Jun. 1985, Isernhagen DE, p. 5, "Mit Werkzeugwechselwagen".
Modern Plastics International, No. 8, Aug. 1991, Lausanne CH, pp. 30-31; P. Toensmeier: "Quick-Change System Add To Blow Molders' Market Reach".

Primary Examiner—Richard L. Chiesa
Attorney, Agent, or Firm—Sixbey, Friedman, Leedom & Ferguson

[57] ABSTRACT

Molds are exchanged by moving a carrier loaded with a cradle between below a mold fitting position of a blow molding apparatus and the mold carrying in and out position. The cradle for supporting the mold is provided with an air blowing means for letting an air into a parison at the time of molding.

1 Claim, 3 Drawing Sheets

MOLD EXCHANGING DEVICE FOR BLOW MOLDING APPARATUS

BACKGROUND OF THE INVENTION

This invention relates to an improvement on a mold exchanging device for a blow molding apparatus, particularly to a counter measure to shorten time required for exchanging molds.

Conventionally, in the case where tubular plastic articles, such as plastic containers, are blow molded, parison pushed out of an extrusion head is caught by a mold of a blow molding apparatus and air is let in the parison by working an air blowing means comprising a pre-pinchers, an air nozzle, etc., arranged below the mold.

When exchanging molds, a carrier is moved between below a mold fitting position of the blow molding apparatus and a mold carrying in and out position, and a mold detached from the blow molding apparatus are loaded on the carrier, and carried out, and a new mold loaded on the carrier is carried in.

However, the conventional blow molding apparatus is provided with an air blowing means below a mold, so that a carrier's operation of carrying in and out the mold is impeded at the time of exchanging molds. Therefore, when exchanging molds, the air blowing means has to be detached from the blow molding apparatus, and another air blowing means suitable to the mold is attached to the blow molding apparatus, and then adjusted. Consequently, it has been a problem that many hours are required for exchanging molds because of the required time for detaching, attaching and adjusting the air blowing means.

SUMMARY OF THE INVENTION

This invention has been made in view of the above problematical points and has for its object to shorten time required for exchanging molds by the following method, namely, an air blowing means is fixed to a cradle for a mold provided on a carrier, so that impedances in exchanging the molds on the carrier can be avoided, and an operation time of detaching, attaching and adjusting can be eliminated.

In order to attain the object, solving means of the present invention is to provide a cradle for supporting a mold of the blow molding apparatus, and an air blowing means for introducing an air flow into a parison at the time of molding. Further provided is a carrier loaded with a cradle thereon for a mold, which is moved between below the mold fitting position of the blow molding apparatus and the mold carrying in and out position for exchanging the molds.

DESCRIPTION OF THE PREFERRED EMBODIMENTS

An embodiment of the present invention is described below on the bases of the drawings.

Figure 2:
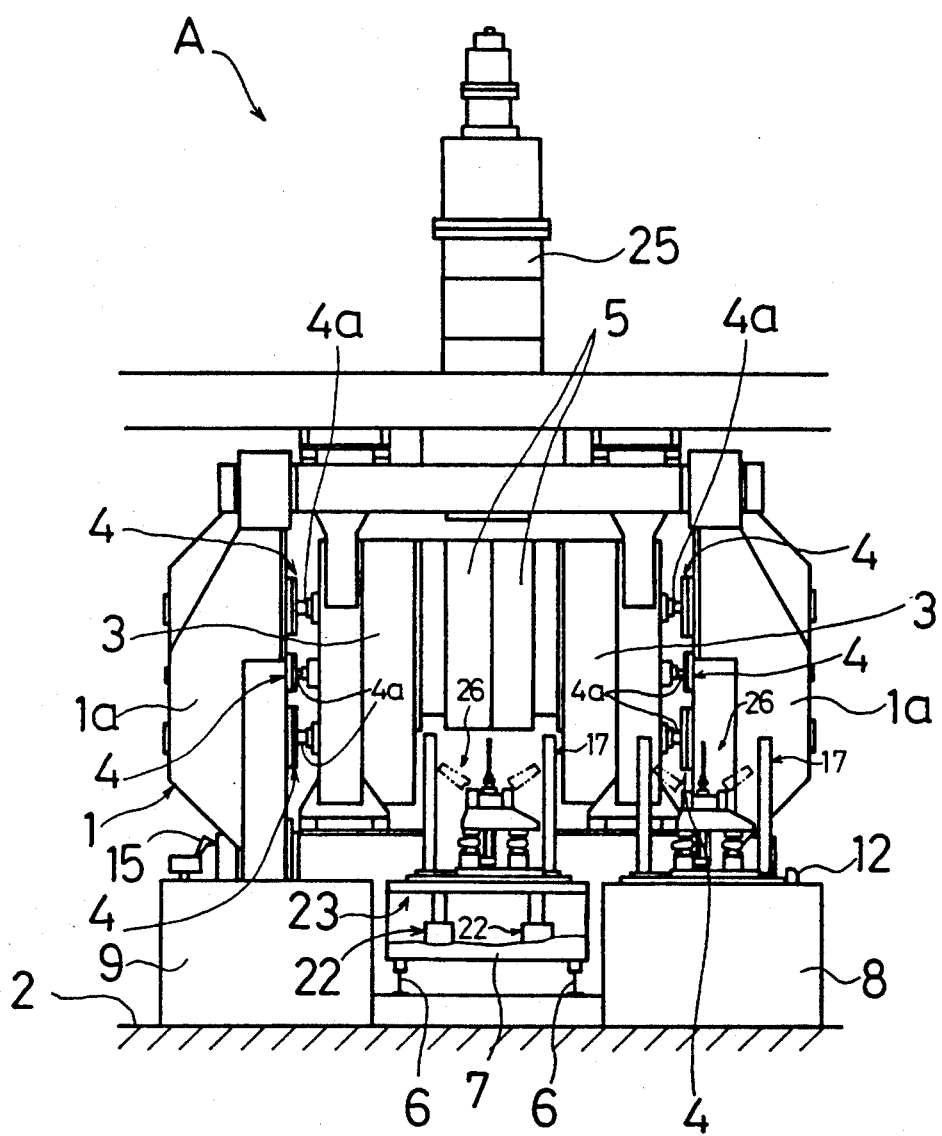
FIG. 2 is an elevation view showing a blow molding apparatus as a whole.
Figure 3:
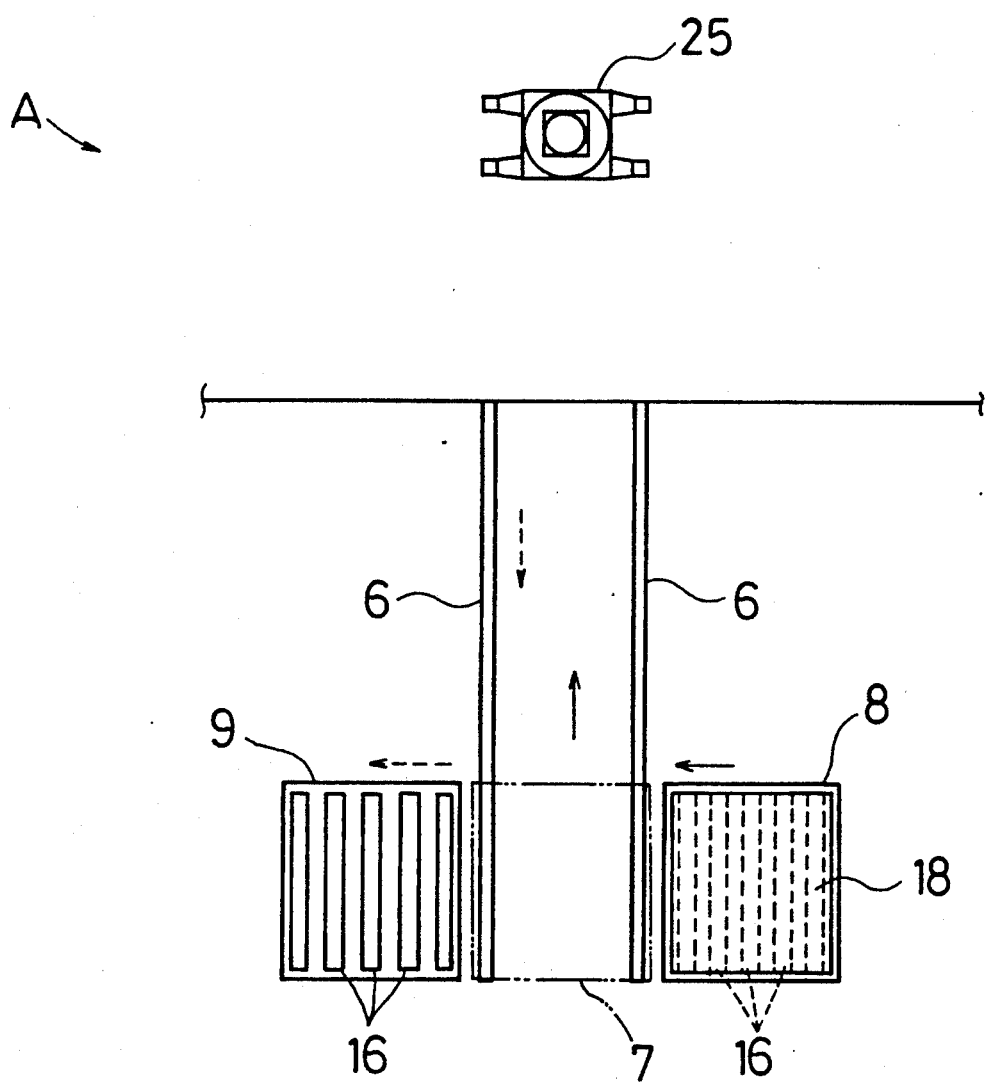
FIG. 3 is a plan view showing a blow molding apparatus as a whole.

FIG. 2 and FIG. 3 show a blow molding apparatus for blow-molding a plastic article (not shown in the drawing). Numeral 1 designates a frame body framed on a floor 2. Numerals 3 designate a pair of platens provided on vertical frame members 1a. These platens 3 in pairs are connected to a top end of a piston rod 4a of first fluid pressure cylinders 4 arranged horizontally with the specified distance left therebetween in vertical direction. The platens 3 approach each other by synchronous expanding operation of each of the first fluid pressure cylinders 4. On the other hand, the platens 3 move away from each other by synchronous contracting operation of each of the first fluid pressure cylinders 4. A mold 5 is fixed detachably to the platens 3 for mold-clamping and mold-opening by synchronous expanding and contracting operations of the first fluid pressure cylinders 4.

Figure 1:
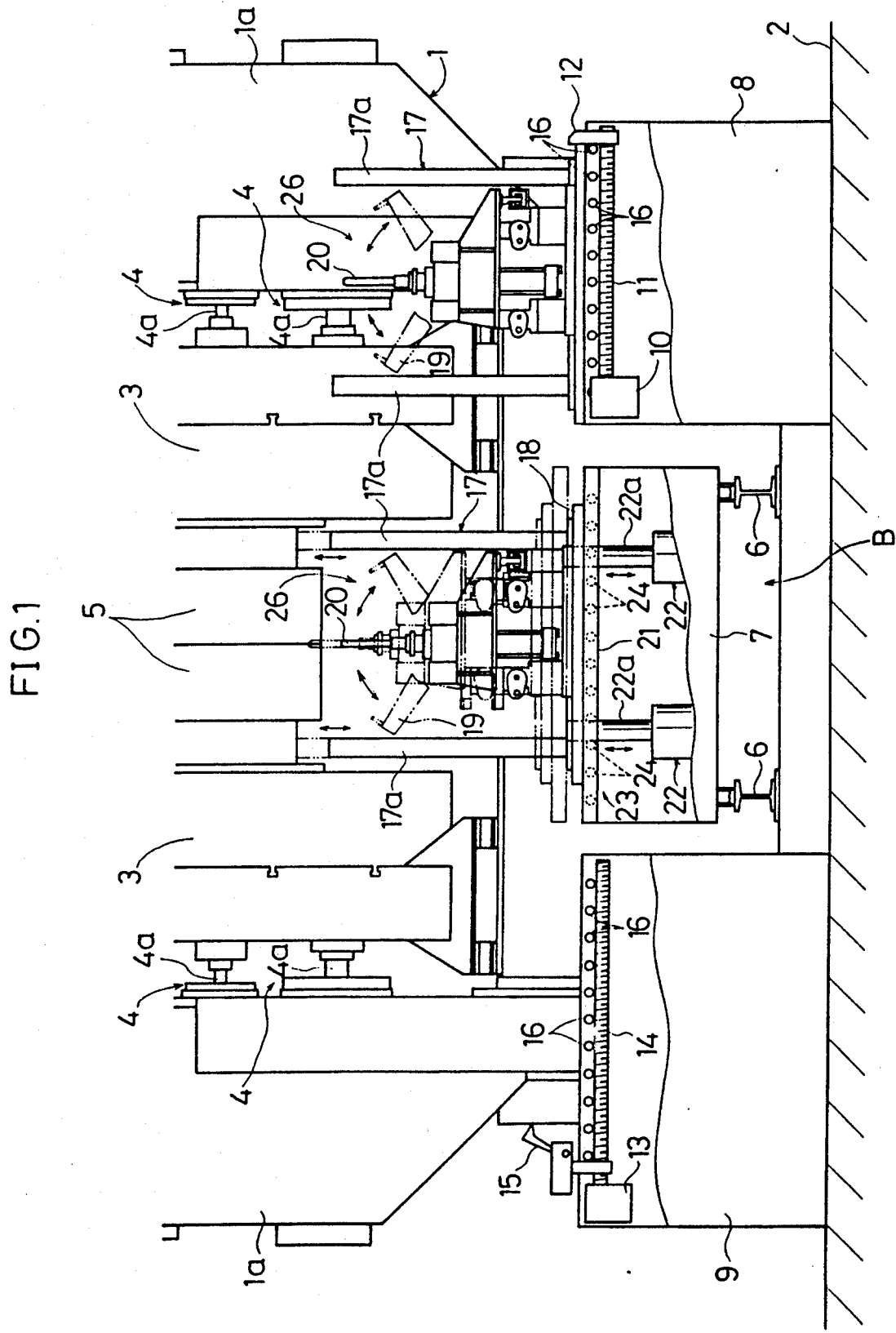
FIG. 1 is a front view of a mold exchanging device.

As shown in the enlarged view of FIG. 1, two guide-rails 6 are laid below the both molds 5. A carrier 7 which can be moved by the drive of a motor (not shown in the drawing) is placed on these two guide-rails 6. A carrier 7 having a cradle (to be mentioned later) placed thereon is moved between below a mold fitting position and the mold carrying in and out position. A first stock table 8 (on the right in FIG. 1) and a second stock table 9 (on the left in FIG. 1) are disposed on both sides of the mold carrying in and out position of the guide-rails 6. A screw shaft 11 which is rotated by a drive of a motor 10 is connected integrally to the first stock table 8. A thrusting tool 12 is connected to the screw shaft 11. The thrusting tool 12 is moved forward (to the left in FIG. 1) by the drive of the first motor 10 to push out a common base 18 (to be mentioned later), and the molds 5 intended for the next production are carried in onto the carrier 7. Namely, there is composed a carrying-in means for carrying in the molds 5 intended for the next production onto the carrier 7 by the first motor 10, the screw shaft 11, and the thrusting tool 12. On the other hand, a screw shaft 14 which is rotated by the drive of the second motor 13 is connected integrally to the second stock table 9. A drawing tool 15 is connected to the screw shaft 14. The molds 5 having finished a production are carried out from the carrier 7 by retreating the drawing tool 15 by the drive of the second motor 13 and pulling out the common base 18. Namely, there is composed a carrying-out means for carrying out the molds 5 having finished the work from the carrier 7 by the second motor 13, the screw shaft 14, and the drawing tool 15.

Further, a plurality of rollers 16 are disposed in two rows on the stock table 8 and 9. On the first stock table 8, provided are a cradle 17 for supporting with each top end of supporting portions 17a molds 5 intended for the next production placed on the common base 18. Between the supporting portions 17a of the cradle 17, disposed is an air blowing means 26 for introducing an air flow into a parison (not shown in the drawing) at the time of molding, namely, a pre-pincher 19, an air nozzle 20, expander and the like. In FIG. 3 only the common base 18 is shown, and the cradle 17, molds 5 and the like are omitted).

A supporting plate 21 is disposed on a top surface of the carrier 7. The supporting plate 21 is connected to top ends of piston rods 22a of a pair of second fluid pressure cylinders 22 having piston rods 22a which can be expanded upward disposed on the carrier 7. The supporting plate 21 is raised by a synchronous expanding operation of each of the second fluid pressure cylinders, whereby the cradle 17 is raised below the mold fitting position of the blow molding apparatus A for exchanging the molds 5. On the other hand, the supporting plate 21 is lowered by the synchronous contracting operation, whereby the cradle 17 is lowered below the mold fitting position for exchanging the molds 5. Namely, there is composed an elevating means 23 for raising and lowering the cradle 17 by the supporting plate 21 and the second fluid pressure cylinders 22 at the place below the mold fitting position for exchanging the molds 5. A mold exchanging device B in this invention is composed of the carrier 7, the first stock table 8, the second stock table 9, the cradle 17, the common base 18, the pre-pincher 19, the air nozzle 20, the elevating means 23 and the like. On the supporting plate 21 of the elevating means 23, disposed are a plurality of rollers 24 in two rows similar to the rollers 24 on the first stock table 8 and the second stock table 9. Numeral 25 in FIG. 2 is an extrusion head for extruding the parison.

A method of exchanging the molds 5 by the mold exchanging device B is described on condition that the molds 5 and the air blowing means 26 supported by the cradle 17 on the common base 18 are disposed on the stock table 8.

After a production is finished, the supporting plate 21 of the elevating means 23 on the carrier 7 placed below the mold fitting position of the blow molding apparatus A are raised by the synchronous expanding operation of the second fluid pressure cylinders 22 to support the molds 5 of the blow molding apparatus A. The molds 5 are detached from the platens 3 by moving the platens 3 away from each other by the synchronous contracting operation of the first fluid pressure cylinders 4, and then the supporting plate 21 is lowered by the synchronous contracting operation of the second fluid pressure cylinders 22.

Afterwards, the carrier 7 is moved to a mold carrying in and out position, the common base 18 on the carrier 7 is hooked by the drawing tool 15 and in this state the molds 5, and the air blowing means 26 with the cradle 17 is pulled out onto the second stock table 9 by the drive of the second motor 13.

Thereafter, the thrusting tool 12 is moved forward by the drive of the first motor 10, the common base 18, namely the cradle 17 intended for the next production (the molds 5 and the air blowing means 26) on the stock table 8, is pushed out onto the carrier 7.

Next, the carrier 7 is moved along the guide rails 6 to a place below the mold fitting position of the blow molding apparatus A, and the supporting plate 21 of the elevating means 23 is raised by the synchronous expanding operation of the second fluid pressure cylinders 22 to correspond to the molds 5.

And then, the platens 3 are approached each other by the synchronous expanding operation of the first fluid pressure cylinders 4 for attaching the molds 5 to each of the platens 3, and in the state where the cradle 17 is lowered by the synchronous contracting operation of the second fluid pressure cylinders 22, next blow molding for a plastic article is conducted.

As shown in the embodiment the molds 5 of the blow molding apparatus A are supported by the cradle 17 on the carrier 7. The carrier 7 is moved between below the mold fitting position of the blow molding apparatus A and the mold carrying in and out position, and then the cradle 17 is raised and lowered below the mold fitting position of the blow molding apparatus A by the elevation means 23.

In this case, the cradle 17 is provided with the air blowing means 26 composed of the pre-pincher 19, the air nozzle 20 for introducing an air flow into the parison at the time of molding so that the air blowing means 26 can be moved unitarily with the carrier 7 and there can be no impedance in the exchanging operation for the molds on the carrier 7. Consequently, there is no necessity of attaching, detaching, and adjusting of the air blowing means 26, namely the mold exchanging time can be shortened.

What is claimed is:
1. A mold exchanging device for a blow molding apparatus, comprising:
    a cradle for supporting a mold of said blow molding apparatus;
    an air blowing means provided on said cradle for introducing an air flow into a parison at the time of molding;
    a carrier loaded with said cradle thereon for exchanging said mold, said carrier being mounted to move between a position below a mold fitting position and a mold carrying in and out position; said carrier including an elevating means for raising and lowering said cradle for exchanging molds below the mold fitting position, said elevating means including a fluid pressure cylinder, and a supporting plate with a piston rod of said fluid pressure cylinder connected thereto;
    a carrying-in means provided on one side of the mold carrying in and out position for carrying in a mold intended for the next production; said carrying-in means including a first motor positioned on a first stock table, a first screw shaft connected to an output of said first motor and a thrust tool movably mounted on said screw shaft for thrusting out said cradle to said carrier from said first stock table; and
    a carrying-out means provided on the other side of the carrying in means for carrying out a mold having finished a production from the carrier; said carrying-out means including a second motor positioned on a second stock table, a second screw shaft connected to an output of said second motor and a drawing tool movably mounted on said second screw shaft for drawing out said cradle from said carrier to said second stock table.

* * * * *